United States Patent
Krien et al.

[19]

[11] Patent Number: 6,118,837
[45] Date of Patent: Sep. 12, 2000

[54] METHOD FOR DETECTING THE DROPPING OF A CONTROL ELEMENT

[75] Inventors: Konrad Krien, Erlangen; Bernd Wernecke, Herzogenaurach, both of Germany

[73] Assignee: Siemens Aktiengesellschaft, Munich, Germany

[21] Appl. No.: 09/333,323

[22] Filed: Jun. 15, 1999

Related U.S. Application Data

[62] Division of application No. 09/045,205, Mar. 20, 1998, which is a continuation of application No. PCT/EP96/04058, Sep. 16, 1996.

[30] Foreign Application Priority Data

Sep. 20, 1995 [DE] Germany .................. 195 34 952

[51] Int. Cl.[7] ............................................. G21C 17/10
[52] U.S. Cl. ..................... 376/258; 376/215; 376/219; 376/240; 376/245
[58] Field of Search ................... 376/258, 215, 376/219, 240, 245

[56] References Cited

U.S. PATENT DOCUMENTS

| | | | |
|---|---|---|---|
| 4,548,784 | 10/1985 | Watari | 376/216 |
| 5,392,321 | 2/1995 | Gaussa, Jr. et al. | 376/258 |
| 5,956,381 | 9/1999 | Krien et al. | 376/258 |

FOREIGN PATENT DOCUMENTS

| | | |
|---|---|---|
| 0 200 999 A1 | 11/1986 | European Pat. Off. . |
| 0 200 999 B1 | 10/1989 | European Pat. Off. . |
| 0 345 704 A1 | 12/1989 | European Pat. Off. . |
| 214 020 | 9/1984 | Germany . |
| 54-134289 | 10/1979 | Japan . |

OTHER PUBLICATIONS

Patent Abstracts of Japan No. 22–81197 (Yasumasa), dated Nov. 16,1990.
Patent Abstracts of Japan No. 60–205705 (Yuuzou), dated Oct. 17,1985.
Patent Abstracts of Japan No. 60–082877 (Hisashi), dated May 11, 1985.
Patent Abstracts of Japan No. 22–22890 (Chikashi), dated Sep. 5,1990.

*Primary Examiner*—Charles T. Jordan
*Assistant Examiner*—Jack Keith
*Attorney, Agent, or Firm*—Herbert L. Lerner; Laurence A. Greenberg; Werner H. Stemer

[57] ABSTRACT

A method for detecting the dropping of at least one control element in a reactor core of a power station by delaying signals output by detectors disposed along a fall path of the control element in such a way that they are approximately simultaneous. This improves a registration of the dropping of the control element by improving a ratio between a useful signal and a noise signal.

8 Claims, 4 Drawing Sheets

METHOD FOR DETECTING THE DROPPING OF A CONTROL ELEMENT

CROSS-REFERENCE TO RELATED APPLICATION

This divisional application claims the benefit under 35 U.S.C. § 120 of U.S. application No. Ser. No. 09/045,205, filed Mar. 20, 1998 which is a continuation of International Application Serial No. PCT/EP96/04058, filed Sep. 16, 1996, which designated the United States.

BACKGROUND OF THE INVENTION

FIELD OF THE INVENTION

The invention relates to a method for detecting the dropping of one or more control elements into a reactor core. The invention also relates to a configuration for carrying out the method.

Nuclear reactors of power stations have so-called control elements which can be moved into and out of a reactor core in order to control the reactor.

A particularly critical malfunction situation occurs if one or more such control elements drop by mistake into the reactor core (in contrast to an intentional drop, for example for an emergency shutdown). The reactor can then no longer be controlled optimally. In a malfunction situation of that type, power densities and distributions that are unfavorable to the burnup of the fuel elements arise in the reactor core.

In that case, the fuel elements are put at particular risk when peaks occur.

Malfunction situations of that type are very critical in terms of the operation of the reactor and of the safety of the power station. The dropping of control elements by mistake into a reactor core must therefore be detected quickly so that suitable counter measures can be initiated in good time.

In principle, the dropping of a control element in the reactor core can be detected by using effects on signals of reactor instrumentation. However, detection is not straight-forward on account of the large number of control elements and the fact that the effects differ according to position.

A suitable number of vertically disposed detector groups are provided inside or outside the reactor core in order to determine the power and/or power density. As a rule, those detectors each output a signal which has an edge when one or more control elements pass them.

To date, the signals from one detector group (per control element or control element group) in practice have firstly been differentiated (in order to obtain a pulse) and then added, so as to provide a total signal pertaining to the dropping of a control element. However, it has been found that such a sum signal was not suitable for reliable fault detection in all cases, in particular due to signal noise.

In connection with controlling the power of a nuclear reactor, U.S. Pat. No. 4,548,784 discloses a method for detecting the dropping of at least one control element in a reactor core, in which signals from detectors disposed along the fall path of the control element are added and fed to a respective monitoring or evaluation device, with the addition being followed directly by averaging.

SUMMARY OF THE INVENTION

It is accordingly an object of the invention to provide a method and an apparatus for detecting the dropping of a control element, which overcome the hereinafore-mentioned disadvantages of the heretofore-known methods and apparatuses of this general type and which permit better fault detection than the prior art for the dropping of control elements in a reactor core, on the basis of existing detector configurations.

With the foregoing and other objects in view there is provided, in accordance with the invention, a method for detecting the dropping of at least one control element into a reactor core, which comprises placing detectors supplying signals along a fall path defining a fall time of a control element; delaying each of the respective signals from the detectors by a delay time proportional to the fall time; then coherently adding the signals to form a sum signal; and feeding the sum signal to a monitoring device.

A better detection of a drop than in the prior art is made possible in this way. This is because the signals are added coherently due to the delays, and interference or noise components are partly eliminated or averaged out through the use of this method. The amplitude of the sum signal is then equal to the sum of the individual signals, so that the noise component is comparatively small as a ratio. The fault detection is therefore particularly reliable. Temporal coincidence is thus produced for the related signals pertaining to an event.

In accordance with another mode of the invention, the respective delay times are fixed in advance. The delay components are therefore particularly simple to produce, and the total expenditure is low.

In accordance with a further mode of the invention, the delay is a function of the respective time difference between the occurrence of the respective signal and that of the last signal. This provides a delay which is dependent on the dropping of the control element. The fault detection is therefore very precise. The delay time may, for example, be determined according to the relationship:

$$Ti=Xn/v-Xi/v$$

in which $i=1, \ldots, n-1$ $Xi$ and $Xn$ indicate positions of respective detectors 1 and n along the fall path of the control elements, $Ti$ indicates the delay times of the respective signals $Xi$ and $Xn$, and $v$ denotes a fall rate of the control elements.

This provides a simple rule, according to which the delay times in the delay components can be calculated.

In accordance with an added mode of the invention, the delay times are determined by using a correlation analysis, through which exact coincidence of the signals is achieved.

In accordance with an additional mode of the invention, it is further beneficial if the respective delay time is determined as a function of the starting position of the control element before it drops. This makes it possible to have coincident monitoring in every operating position of the control element. The instantaneous operating state is thus taken into account. The different fall times are thereby taken into account exactly, and a high degree of accuracy in the fault detection is achieved through the use thereof.

In accordance with yet another mode of the invention, before they are added, the signals are fed to a thresholding process so that only signals exceeding a predetermined threshold are added. Therefore, only signals with a predetermined signal amplitude are evaluated, through the use of which, for example, it is possible to discriminate between fast insertion of the control element and dropping by mistake.

In accordance with yet a further mode of the invention, in the thresholding process, the signals are converted into binary signals, which makes them simpler to evaluate in comparison with an analog signal waveform (even in digitized form).

In accordance with yet an added mode of the invention, the signals produced by the detectors are differentiated first, before they are processed further. Instead of an edge signal, this provides a pulse which is beneficial in terms of signal processing.

With the objects of the invention in view, there is also provided a method for detecting the dropping of at least one control element into a reactor core, which comprises placing detectors supplying signals along a fall path of a control element; adding the signals from the detectors to form a sum signal; integrating the sum signal; differentiating the integrated sum signal; and feeding the differentiated integrated sum signal to a monitoring device.

This permits high-precision fault detection which, in particular, is suitable for digital signal processing using a computer, for example in a control automation device with a microcomputer.

With the objects of the invention in view there is additionally provided a method for detecting the dropping of at least one control element into a reactor core, which comprises placing detectors supplying signals along a fall path of a control element; feeding the signals from the detectors to thresholding components having binary output signals time-delayed to be approximately simultaneous; feeding the delayed binary output signals to a coincidence monitoring device for registering or identifying the dropping of the control element; and recording and feeding the signals from the coincidence monitoring device to a monitoring device.

This manner of achieving the object is very simple and provides better fault detection and signal evaluation than the prior art.

With the objects of the invention in view there is also provided a configuration for detecting the dropping of at least one control element into a reactor core, comprising detectors disposed along a fall path of at least one control element of a reactor core defining a fall time, the detectors having signal outputs; delay components having a delay time proportional to the fall time, the delay components each connected to the signal output of a respective one of the detectors; a common adder component connected to the delay components, the common adder component having an output side; and a monitoring device connected to the output side of the common adder component.

With this configuration, in contrast to the prior art, coincidence monitoring of the signals is possible, which leads to reliable fault monitoring in the reactor core.

In accordance with another feature of the invention, a differentiator component is connected in each case between the respective detectors and the adder component. Pulses which permit beneficial coincident signal processing are therefore available as signals.

In accordance with a further feature of the invention, there is provided a thresholding component in each case connected between the respective detectors and the adder component. Therefore, only signals which are unambiguously due to the dropping of a control element are processed. This is because control elements drop at a high fall rate, which results in a higher signal amplitude than under normal conditions for the control elements. Further alternative configurations may also be provided for alternative methods.

In accordance with a concomitant feature of the invention, the respective signal processing components and/or the monitoring device are formed by one or more programmed computers. This provides more reliable monitoring of malfunctions, which is fast and, where appropriate, can be effected by using an existing computer with all of the advantages of digital signal processing.

Other features which are considered as characteristic for the invention are set forth in the appended claims.

Although the invention is illustrated and described herein as embodied in a method and an apparatus for detecting the dropping of a control element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
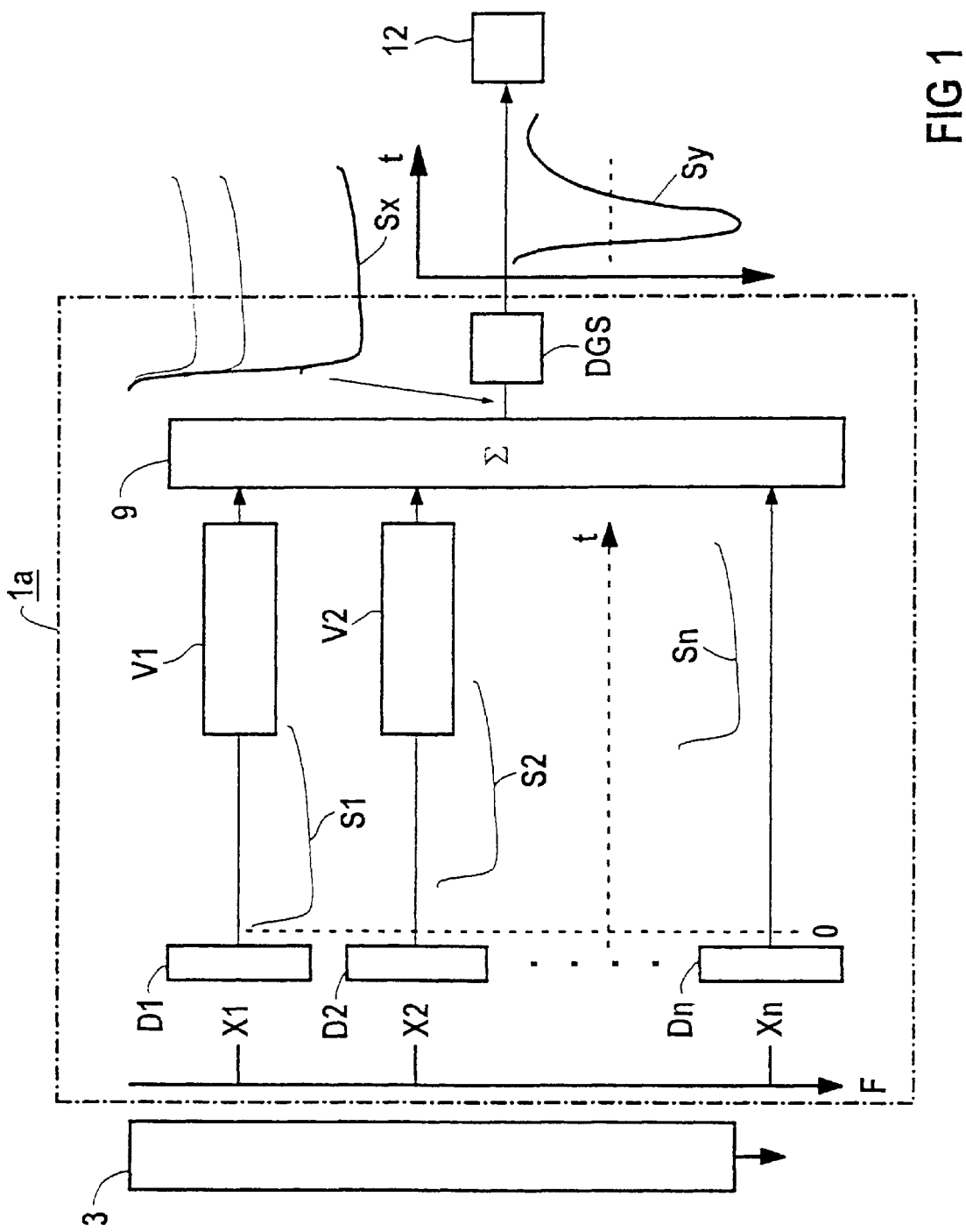
FIGS. 1 to 4 are block diagrams showing four alternative illustrative embodiments of configurations for detecting the dropping of control elements.

Referring now to the figures of the drawings in detail and first, particularly, to FIG. 1 thereof, there is seen a preferred embodiment of a first configuration 1a for detecting the dropping of a control element 3 into a non-illustrated reactor core. Detectors D1 to Dn are disposed in positions X1 to Xn at predetermined distances along a fall path F of the control element 3 (or of a control element group). The number of detectors D1 to Dn and the distances between them depend essentially on the desired detection accuracy and on the acceptable level of expense. For the sake of simplicity, only three detectors D1, D2 and Dn are shown in the figures. The procedure is discussed herein, purely by way of example, with reference to the example of one control element 3. However, it can be applied logically to a plurality of control elements 3 or for all of the control elements 3 of a reactor core.

The detectors D1 to Dn can be constructed in a wide variety of ways. They may, for example, respond to radioactivity, heat, electromagnetic effects or other physical effects. It is essential in the present case that the detectors detect the dropping of the respective control element 3 at the place where they are installed, through a physical effect and a corresponding signal.

In particular, the following detector types that are known from the art are usable: neutron flux, gamma, beta, alpha detectors and measuring sensors or thermocouples for the local coolant temperature. It is expedient for the detectors D1 to Dn which are in any case disposed in or outside the reactor core, to be used for the present function. They may, for example, be detectors D1 to Dn for determining power density. In the figures, reference symbols S1 to Sn denote signals that are respectively output by the detectors D1 to Dn. When the control element 3 drops downward, the detectors D1 to Dn in each case successively produce the signals S1 to Sn with signal edges, as the control element 3 goes past. The edges (rising edges) of the signals Si to Sn thus occur one after the other with a time delay.

The representation of the signal edges of the signals S1 to Sn which is shown in the figures is chosen according to their time delay on a time axis t (indicated by dashes). In the present case, it is assumed that the detectors D1 to Dn each output a constant signal. The signals S1 to Sn which are shown are therefore, for example, formed as constant signals with rising edges. Other types of signals, for example alternating signals, are likewise conceivable.

The signals S1 and S2 are then subsequently delayed, using delay components V1 and V2, in such a way that their edges are approximately simultaneous with the edge of the signal Sn. A relative delay with respect to the signal Sn thus takes place. If n detectors Dn are provided, the detectors D1 to Dn−1 (non-illustrated) have a delay component V1 to Vn−1 (non-illustrated). An adder component 9 is provided, so that a sum signal Sx is obtained which has a large steep rising edge. In order to make the sum signal Sx more readily processable, it may be subsequently further fed through a differentiating component DGS, so as to yield a pulse sum signal Sy which is then fed to a monitoring device 12.

The monitoring device 12 is used, for example, for the detection, processing or signaling of faults, or for data transmission and is constructed according to the generally known prior art. It may initiate further reactions to the drop of the control element and is incorporated in a drive or control system of the reactor.

The approximate addition of the respective signals S1 to Sn produces a considerable increase in the useful signal component in comparison with the interference signals, which provides better evaluation. Noise components in the interference signal in this case are at least partly eliminated, so that it is easier for the downstream monitoring device 12 to detect the drop.

The delay time in the delay components V1, V2 may be fixed in advance according to the sites where the detectors D1 to Dn are installed. The delay times may then be determined by trials or on the basis of theoretical considerations. This procedure can, for example, be carried out by using an analog or digital circuit, in particular a computer.

However, the signals S1 to Sn may also be respectively stored firstly. The respective delay time is then given from the difference between the occurrence of the respective signal S1 to Sn and the last signal Sn. This procedure is suitable, in particular, for digital signal processing using a computer.

The delay times of the respective delay components V1 to Vn−1 (non-illustrated) can be calculated according to the following relationship:

$$Ti = Xn/v - Xi/v.$$

In this equation, I=1, . . . , n−1:

Xi and Xn indicate the positions of the respective detectors D1 and Dn along the fall path F of the control element 3, Ti indicates the delay times of the respective signals S1 to Sn from the detectors D1 to Dn at the positions Xi and Xn, and v indicates the fall rate of the respective control element 3.

Figure 2:
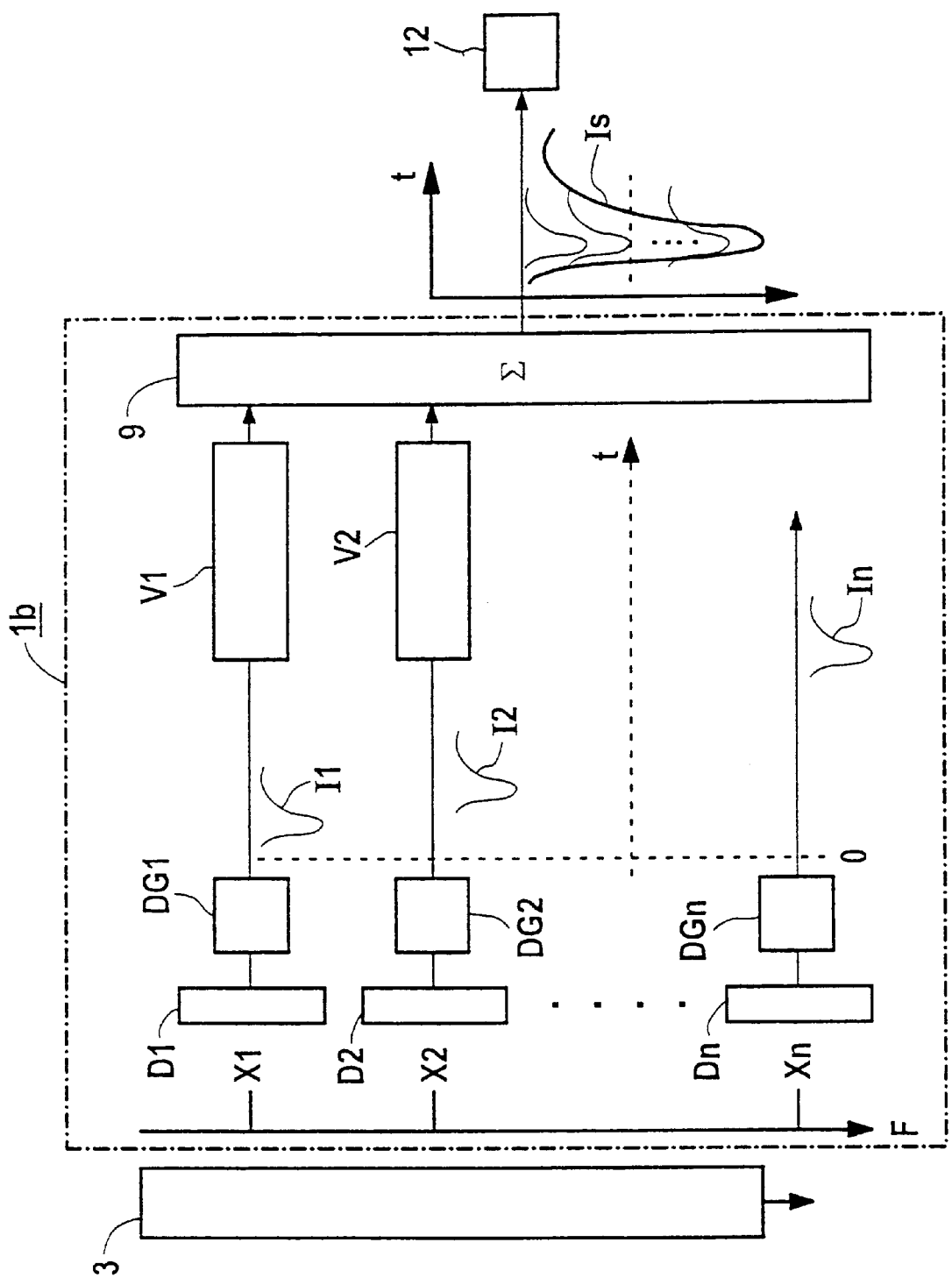

FIG. 2 shows a second variant, in which a configuration 1b has differentiation components DG1 to DGn that are connected downstream of the respective detectors D1 to Dn, in each signal path of the detectors D1 to Dn. The edges of the signals from the detectors D1 to Dn are thereby converted into pulses I1 to In which are well-suited to signal processing. The addition produces a sum pulse Is.

Figure 3:
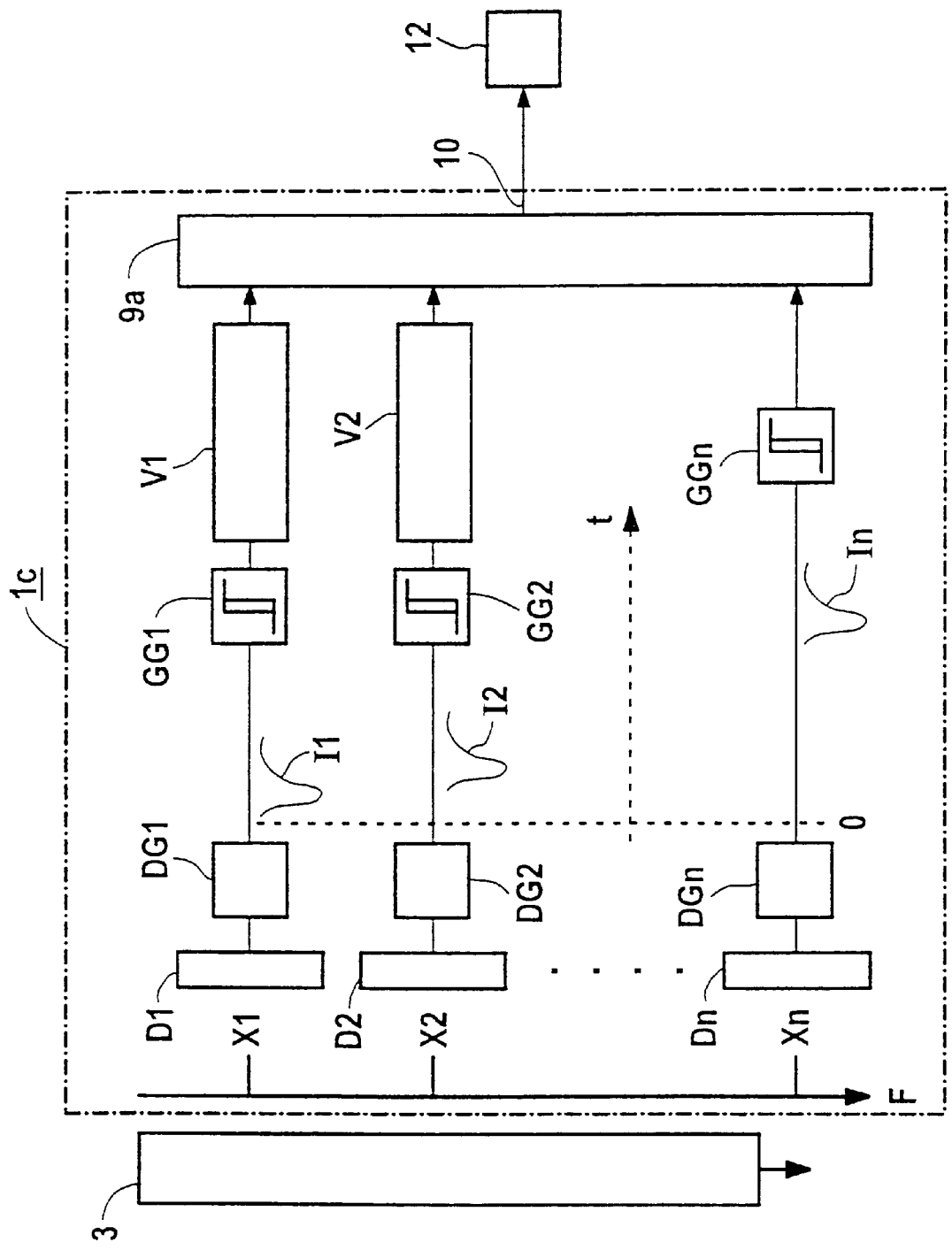

A configuration 1c according to FIG. 3 has thresholding components GG1 to GGn connected downstream of the differentiation components DG1 to DGn. In this way, only signals which have a predetermined amplitude are evaluated and delayed. In this case the amplitude is dependent on the dropping rate. A control rod driven slowly into the reactor core therefore does not lead to a detected signal.

The embodiment of the configuration 1c according to FIG. 3 may also be realized in such a way that the thresholding components GG1 to GGn output binary signals. After the binary signals have been delayed by the delay components V1 and V2, the binary signals are then fed to a coincidence monitoring device 9a. The latter then performs a logical check of the binary signals, through the use of which the dropping of the control element 3 is detected.

The coincidence monitoring device 9a then outputs a fault detection signal at its output 10, which is fed to the monitoring device 12 already described above. The embodiment of the configuration 1c is suitable, in particular, for digital signal processing, in which the outputs of the detectors D1 to Dn are connected to inputs of an automation device which has a computer. The signal processing components referred to are then constructed in the form of software or programs.

Figure 4:
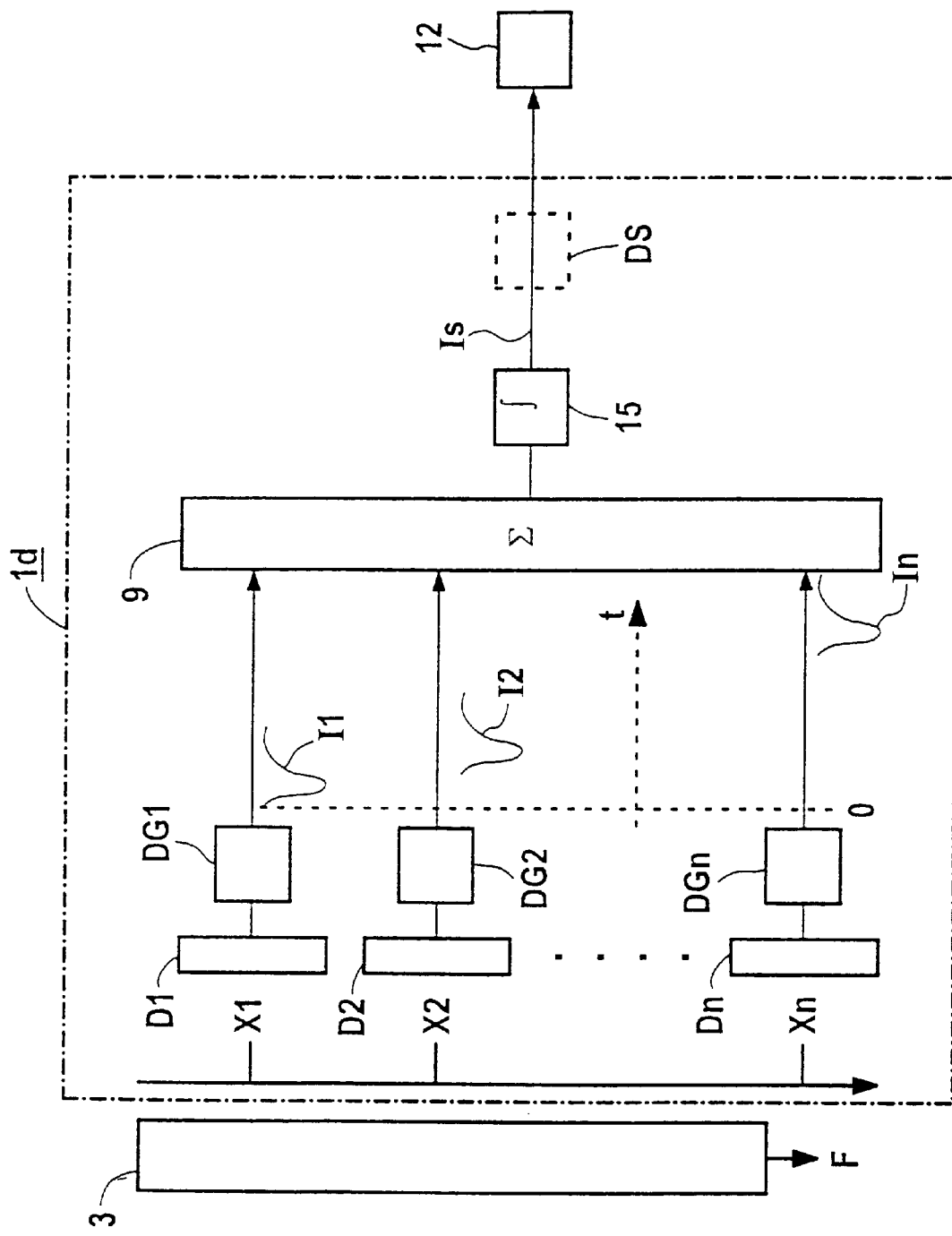

In individual cases, and under certain conditions, a simple detection according to FIG. 4 may also be sufficient. In this case, pulse signals I1 to In are firstly added and then integrated with respect to time using an integrator 15. This produces a sum pulse Is which also leads directly to improved evaluation and detection in comparison with the prior art. This signal may then optionally be subsequently fed to a differentiation stage DS, with the result of providing a characteristic pulse which has a good signal-to-noise ratio.

It is also conceivable for the signals to be checked by using logic before they are processed further, in order to detect certain fault situations or in order to stop further processing on the grounds of false information. This type of logical check for the signals is also suitable for an embodiment involving a computer.

Any desired combinations of the above-mentioned features are, of course, conceivable within the knowledge of the person skilled in the art, without departing from the fundamental concept of the present invention.

We claim:

1. A method for detecting the dropping of at least one control element into a reactor core, which comprises:

placing detectors supplying signals along a fall path defining a fall time of a control element;

delaying each of the respective signals from the detectors by a delay time proportional to the fall time;

coherently adding the signals to form a sum signal; and feeding the sum signal to a monitoring device.

2. The method according to claim 1, which comprises fixing the respective delay time for the respective signals in advance.

3. The method according to claim 1, which comprises determining the respective delay time as a function of a starting position of the respective control element before it drops.

4. The method according to claim 1, which comprises determining the delay time from a respective difference between an occurrence of a respective signal and an occurrence of the last signal.

5. The method according to claim 1, which comprises determining the delay time by a correlation analysis.

6. The method according to claim 1, which comprises differentiating the signals produced by the detectors before the signals are processed further.

7. The method according to claim 1, which comprises feeding the signals to a thresholding process before adding the signals, and adding only the signals exceeding a predetermined threshold.

8. The method according to claim 7, which comprises converting the signals into binary signals in the thresholding process.

* * * * *